United States Patent [19]

McCready

[11] 4,125,526

[45] Nov. 14, 1978

[54] VACUUM BLANKET CURING METHOD

[75] Inventor: John E. McCready, Phoenix, Ariz.

[73] Assignee: Goodyear Aerospace Corporation, Akron, Ohio

[21] Appl. No.: 320,418

[22] Filed: Jan. 2, 1973

[51] Int. Cl.$^2$ ............................ B29C 1/02; B29H 3/00
[52] U.S. Cl. ...................................... 264/90; 156/285; 156/286; 264/219; 264/225; 264/279; 264/308; 264/316
[58] Field of Search ...................... 264/89, 90, 92, 219, 264/225, 308, 309, 264, 279, 255, 313–316; 156/285, 286

[56] References Cited

U.S. PATENT DOCUMENTS

| | | | |
|---|---|---|---|
| 1,362,169 | 12/1920 | Macbeth | 425/44 X |
| 3,492,393 | 1/1970 | Nourot et al. | 264/308 X |
| 3,666,600 | 5/1972 | Yoshino | 264/90 X |
| 3,699,198 | 10/1972 | Robinson | 264/264 X |

*Primary Examiner*—Jan H. Silbaugh
*Attorney, Agent, or Firm*—J. D. Wolfe; F. W. Brunner

[57] ABSTRACT

A method of making a vacuum blanket for vacuum curing elastomeric and plastic materials and more specifically, it relates to making a vacuum blanket by spray coating a polyurethane liquid reaction mixture.

2 Claims, No Drawings

VACUUM BLANKET CURING METHOD

This invention relates to a method of vacuum curing thermoplastic or elastomeric materials wherein a vacuum blanket is utilized in the course of the cure. More particularly, this invention relates to the use of a spray formed polyurethane blanket in conjunction with a mold to cure a thermoplastic or elastomeric material.

The use of vacuum blankets to cure thermoplastic or elastomeric materials has been practiced for a number of years. Initially, the blanks were formed of natural rubber coated fabric sheets and the necessary fabric innerlayer with venting arrangements to facilitate drawing a vacuum on the blanket in order to permit the thermoplastic or elastomeric material to be cured without air bubbles between plies. Natural rubber blankets were not too satisfactory, as they tended to deteriorate in steam and air. For the last dozen or more years, butyl blankets have been utilized.

The butyl blankets were formed by coating fabric by either calendering or on a coater or spreader with sufficient butyl rubber to give a rubberized sheet stock. Then this sheet stock was cut, laid up over the article and hand stitched or cemented together before curing to give essentially a tight fit of the shaped butyl blanket around the article to be cured. Of course, it is appreciated that the common practice was to utilize a fabric, preferably cotton cords, between the butyl rubber and the thermoplastic material with this fabric or cord being connected to a vacuum line fitting to permit a vacuum to be pulled between the blanket and the thermoplastic material. In this manner the blanket fits tightly against the thermoplastic material and when the blanket and article were placed within an autoclave then sufficient pressure could be developed by hot air or steam to effect a cure and shaping of the thermoplastic material during the cure.

As indicated above, the prior art method of making blankets and curing was time consuming and required appreciable apparatus to form and shape the blanket. Also, the blankets tended to become heat set and weakened or failed with repeated use. When a crack or tear came in the blanket, the blanket had to be thrown away as there was no real easy and satisfactory method for repairing the blanket. Therefore, the principal object of this invention is to provide a method of making the blanket and utilizing the blanket where the blanket is a polyurethane.

In accordance with the invention a thermoplastic or elastomeric material containing a curative is applied to the surface of a female or male mold part and this thermoplastic or elastomeric material is smoothed down to the desired dimensions for the thermoplastic material, then a release coat is applied over the thermoplastic material and this release coat is followed by one or more spray coats of a liquid polyurethane reaction mixture. It should be appreciated that sufficient fabric members, usually cotton cords, are placed along and over the release coat to facilitate a vacuum to be drawn when the finished coating and fabric members are connected to a suitable vacuum apparatus. The liquid polyurethane reaction mixture can be applied over the release coat in any of the normal manners utilized in applying a liquid polyurethane coating. For example, application by swabbing, brushing or spray coating the part with a liquid polyurethane reaction mixture are the preferred methods. It is preferred that the liquid polyurethane reaction mixture be one that is self curing at room temperature, although elevated temperatures may be utilized where desired, except it is difficult to properly distribute the heat over the surface of the polyurethane costs. Also, the number of polyurethane coats applied depends on the thickness, the shape and size of the article being molded or formed from the thermoplastic material. Usually, about one-sixteenth to three-sixteenth of an inch of thickness will be more than adequate, especially where relatively heavy weight fabric members are dispersed through the coating. The nature of this invention may more readily be understood by reference to the following examples, wherein all parts and percentages are by weight unless otherwise designated.

EXAMPLE I

A fiberglass mold approximately 30 by 10 feet in diameter having the shape of the Sonardome bubble on the front of a warship was coated with several layers of compounded rubberized fabric sheet where the rubber is acrylonitrile butadiene containing a tin compound as an antifoulant. These rubberized fabric sheets are laid up over the fiberglass mold, shaped and stitched down in the normal manner to give an unvulcanized Sonordome for a ship over the mold part. The Navy specification calls for metal wire reinforcing which is applied during ply-up of the rubberized sheet. Over this unvulcanized rubberized fabric shaped Sonordome is applied a spray coat of talc powder, fluorocarbons, silicones as release agents, waxes, etc. or a water dispersion of polyethylene mold release or parting agent can be used. Where the polyethylene mold release agent contains either a water or a low boiling solvent base, it is desirable to allow the release coat to stand exposed to the atmosphere for sufficient time to reduce the amount of carrier, i.e. water or solvent present in the release coat. Since it is desirable that the Sonordome be cured in a steam autoclave, the liquid polyurethane coating, applied over the rubberized fabric sheet laid up on the Sonordome mold, is of the type known as a hydrolysis resistant polyurethane, i.e. treatment with steam and water at 300° F. and higher. In this embodiment the liquid polyurethane reaction product is a methyl ethyl ketone solution of a 4,4'-bis cyclohexyl methane diisocyanate with a polypropylene ether glycol of about 2000 moleclar weight and a curative of isoporone diamine. Several coats of this liquid polyurethane reaction mixture is applied to give a polyurethane coating over the Sonordome of about one sixteenth to one-fourth inch thick. This coating is allowed to stand at least about 12 hours and then the mold part with the elastomeric fabric thereon is placed in a steam autoclave and the vacuum fittings built in the blanket are attached to the vacuum lines on the autoclave and a vacuum pulled thereon. If the mold release extends fully over the mold part, then a flange-like clamp will be needed to anchor the blanket.

In regard to the vacuum lines and fabric connections, it should be indicated these are the traditional ones utilized in building rubberized fabric fuel tanks or blanket type cures where the fabric extends back to and through the blanket to have connection with the vacuum lines. With the vacuum pull on the blanket, fiz. about 20 inches or more of water, then the steam is turned on the autoclave to obtain a pressure of approximately 300° F. or higher and a pressure of 80 to 120 p.s.i. within the autoclave. The part to be cured is allowed to remain in the autoclave at this temperature and pressure for several hours. A big part like the Sonordome sometimes is allowed to remain in the autoclave for 24 hours at 300° F. or higher.

The vacuum arrangements/connections/layout/lines have a series of cotton cords laid on the mold release in the strategic areas to vent the air during cure. The fittings, lines and bleeder cords are likewise positioned on the mold release prior to application of the first spray coat of liquid polyurethane and thus are built into the blanket as the various spray coats are applied. Although the vacuum arrangements, connections and layout lines have been described as connected by a series of cotton cords, it should be appreciated that cloth, fabric, paper or related materials can be used as well.

Any of the polyurethane reaction mixtures can be used to build the vacuum blanket by spraying or related application techniques. The polyurethane reaction mixture comprises a mol of reactive hydrogen material of about 800 to 6500 molecular weight, on 1.1 to 7 mols of an organic polyisocyanate and a curative of the polyol, diamine or amino alcohol classes. The reactive hydrogen materials are represented by the polyester polyols, polyether polyols and hydrocarbon polyols. The nature of the polyurethane reaction mixture is well known and illustrated by teachings of U.S. Pat. Nos. 3,004,939; 2,620,516, and others.

Representative examples of the thermoplastic or elastomeric materials useful in this invention are the natural and synthetic resins and rubbers such as the polyolefins of the conjugated diolefins of 4 to 12 carbon atoms, the monoolefins of 2 to 20 carbon atoms which may contain halogen, nitrogen and sulfur atoms and co, ter and higher polymers of the diolefins or monoolefins and mixtures. In fact, any of the well known thermoplastics and elastomers used n vacuum molding can be utilized. Any of the curatives for the thermoplastics and elastomers can be used, for example, sulfur or sulfur generating curatives, peroxides, and metal oxides.

In another embodiment an electric assembly, i.e. the electrical wire guide with electrical leads covered with rubberized nylon fabric, for use as a deicer for airplane wings, is placed in a female mold part. The rubberized nylon fabric is a woven nylon fabric coated with a magnesium oxide-zinc oxide compounded Neoprene rubber. A polyurethane blanket is then used to close the mold and clamped in place by a rectangular flange. A vacuum of about 28 inches of water is pulled on the polyurethane blanket by the vacuum line and fabric of the blanket and the Neoprene is heated by steam to cure the deicer assembly. Then the vacuum is broken and the blanket removed to permit the molded part to be removed.

In another embodiment a slug of compounded curable Neoprene rubber is placed in a mold having a semicircular cavity and is pressed down to fill the cavity. A coat of a silicone mold release is applied over the Neoprene. A cotton cord is laid over the release coat and covered with silicone mold release to the rubber vacuum line that the cord fits into to permit a vacuum pump to be connected to the line and thereby pull a vacuum between the blanket and the plug of Neoprene. A vacuum blanket is formed by spray coating over the mold release a 0.25 inch coating of a mixture of polyether methylene glycol toluene diisocyanate prepolymer and methane di(phenyl isocyanate) and cured. A rectangular flange is used to hold the blanket on the mold. Curing and molding of the Neoprene is achieved by pulling a 20 inch vacuum on the vacuum line while the mold rests in an autoclave at 275° F. It is preferred that the cure be at a temperature such that the plastic will flow or deform under the molding conditions to fill the mold.

In some embodiments it is desirable to use sheets of rubberized fabric having air valves positioned therein to cover and connect the bleeder chords rather than a silicone mold release as this gives a more permanent and sturdy vacuum line connection, in the event the blanket is to be used for many rather than a few cures.

While certain representative embodiments and details have been shown for the purpose of illustrating the invention, it will be apparent to those skilled in this art that various changes and modifications may be made therein without departing from the spirit or scope of the invention.

What is claimed is:

1. The method of shaping and molding a thermoplastic or elastomeric article comprising applying a coating of the thermoplastic or elastomeric material over a mold, then applying a mold release over the material and building a vacuum cure blanket by applying sufficient liquid polyurethane reaction mixture over the mold and mold release which has at least one vacuum fitting positioned thereon to produce a blanket when cured over the mold, one-sixteenth to three-eighths inch thick having at least one vacuum fitting therein, curing said mixture to form a blanket, placing a vacuum on the fittings in the blanket to cause the blanket to move toward the mold, transferring heat from the mold to the thermoplastic or elastomeric material to raise the thermoplastic or elastomeric material to its flow and vulcanization temperature and maintaining the vacuum and temperature until the material is vulcanized, releasing the vacuum and removing the blanket to permit the molded article to be stripped from the mold.

2. The method of claim 1 wherein a vacuum bleeder means is positioned on the mold release prior to building the vacuum blanket.

* * * * *